(12) United States Patent
Walter et al.

(10) Patent No.: US 9,109,561 B2
(45) Date of Patent: Aug. 18, 2015

(54) METHOD AND DEVICE FOR ZERO-FUEL QUANTITY CALIBRATION OF A FUEL INJECTOR

(71) Applicant: ROBERT BOSCH GMBH, Stuttgart (DE)

(72) Inventors: Michael Walter, Kornwestheim (DE); Joachim Palmer, Korntal-Muenchingen (DE); Andreas Rupp, Marbach (DE); Stefan Bollinger, Marbach am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/366,649

(22) PCT Filed: Dec. 3, 2012

(86) PCT No.: PCT/EP2012/074271
§ 371 (c)(1),
(2) Date: Jun. 18, 2014

(87) PCT Pub. No.: WO2013/092190
PCT Pub. Date: Jun. 27, 2013

(65) Prior Publication Data
US 2015/0034048 A1 Feb. 5, 2015

(30) Foreign Application Priority Data
Dec. 20, 2011 (DE) .......... 10 2011 089 296

(51) Int. Cl.
*F02M 65/00* (2006.01)
*F02D 41/14* (2006.01)
(Continued)

(52) U.S. Cl.
CPC ......... *F02M 65/001* (2013.01); *F02D 41/1498* (2013.01); *F02D 41/247* (2013.01);
(Continued)

(58) Field of Classification Search
CPC ... F02M 65/00; F02M 65/001; F02M 69/002; F02M 69/28; F02M 45/02; F02M 45/04
USPC ........... 123/445, 496, 575; 701/103, 104, 105
See application file for complete search history.

(56) References Cited

U.S. PATENT DOCUMENTS 6,053,150 A * 4/2000 Takahashi et al. ............ 123/501
7,904,233 B2 * 3/2011 Kweon et al. ................. 701/104
(Continued)

FOREIGN PATENT DOCUMENTS

DE         199 45 618        3/2001
DE      10 2006 006303       6/2007
(Continued)

OTHER PUBLICATIONS

International Search Report for PCT/EP2012/074271, dated Feb. 27, 2013.

*Primary Examiner* — Lindsay Low
*Assistant Examiner* — Grant Moubry
(74) *Attorney, Agent, or Firm* — Kenyon & Kenyon LLP

(57) ABSTRACT

In a method for calibrating a fuel metering system including an injector of an internal combustion engine performing a pilot injection chronologically prior to a main injection, at least two test injections chronologically prior to the pilot injection are provided for the injector, the first test injection being carried out using a first activation duration, in which the injector does not yet open, at least one second test injection being carried out in a subsequent injection cycle using an activation duration which is progressively increased in each case in relation to the first test injection until a change of an operating variable of the fuel metering system or the internal combustion engine results, which activation duration corresponds to a minimum activation duration of the injector.

11 Claims, 4 Drawing Sheets

(51) Int. Cl.
    *F02D 41/24*     (2006.01)
    *F02D 41/40*     (2006.01)
    *F02D 41/20*     (2006.01)

(52) U.S. Cl.
    CPC .......... *F02D41/2438* (2013.01); *F02D 41/403* (2013.01); *F02D 2041/2055* (2013.01); *F02D 2200/063* (2013.01); *Y02T 10/44* (2013.01)

(56) References Cited

U.S. PATENT DOCUMENTS

| | | | |
|---|---|---|---|
| 2005/0121000 A1* | 6/2005 | Vermonet et al. | 123/435 |
| 2006/0047405 A1* | 3/2006 | Bouchain et al. | 701/104 |
| 2006/0090733 A1* | 5/2006 | Fujii | 123/446 |
| 2007/0169756 A1* | 7/2007 | Potter et al. | 123/490 |
| 2007/0192019 A1* | 8/2007 | Bohnig et al. | 701/114 |
| 2011/0106409 A1* | 5/2011 | Walter et al. | 701/103 |

FOREIGN PATENT DOCUMENTS

| | | |
|---|---|---|
| DE | 10 2008 002 482 | 12/2009 |
| DE | 10 2008 043 165 | 4/2010 |
| EP | 0 940 571 | 9/1999 |
| EP | 0 947 686 | 10/1999 |
| EP | 1 813 796 | 8/2007 |
| WO | WO 2004/053316 | 6/2004 |

* cited by examiner

METHOD AND DEVICE FOR ZERO-FUEL QUANTITY CALIBRATION OF A FUEL INJECTOR

BACKGROUND OF THE INVENTION

1. Field of the Invention

The present invention relates to a method and a device for calibrating a fuel metering system of an internal combustion engine, in particular of a motor vehicle.

2. Description of the Related Art

In today's fuel injection systems of the type included here, for example, in common-rail diesel injection systems, to improve a mixture formation, partial injections having relatively small fuel quantities are carried out at the same time before a corresponding main injection. The mentioned main injection is generally calculated based on a torque request of a corresponding driver. The injection quantities of the mentioned partial injections are to be as small as possible to avoid emission disadvantages. On the other hand, the injection quantities must be sufficiently large so that, in consideration of all tolerance sources, the minimum quantity necessary for the corresponding combustion process is always discharged. A mixture formation improved in this way allows reduced exhaust gas emissions and decreased combustion noises.

The small fuel quantities in the case of the mentioned partial injections require precise metering of the particular injection quantities. If a partial injection is entirely omitted, for example, because a provided injection component, in the case of common-rail injection systems an injector, has not yet injected as a result of routine tolerances in the case of an underlying control signal, this has substantial effects on the operation of the internal combustion engine, which is expressed, for example, by increased noise development during the combustion.

In the case of the mentioned common-rail diesel injection systems, pressure generation and injection are decoupled from one another with the aid of a high-pressure accumulator, a so-called "rail," the injection pressure being generated independently of the engine speed and the injection quantity and being available for the injection in the high-pressure accumulator. The particular injection timing and the particular injection quantity are calculated in an electronic engine control unit and are metered by the corresponding injectors of each cylinder of the internal combustion engine via remote-controlled valves. It is to be ensured that the mentioned partial injections are always implemented with the highest possible precision.

Manufacturing tolerances occurring during the manufacturing of injectors of a corresponding fuel metering system cause differences in the operating characteristics of the individual injectors, which often only occur over the lifetime of the particular injectors or of the fuel metering system or are even amplified during the lifetime. In addition, the injectors of a fuel metering system typically have different quantity characteristics maps, i.e., different dependencies between injection quantities, rail pressure, and activation duration. This has the result that the various injectors also fill the corresponding combustion chamber with different quantities of fuel in the event of a very precise activation.

A substantial tolerance source for the quantity precision of the pilot injection is therefore the so-called "drift" of the particular injector, i.e., the operating characteristics, which continuously change over the lifetime of the injector.

Metering of the mentioned minimal quantities is carried out based on a so-called zero-fuel quantity calibration. This is described, for example, in the publication published German patent application document DE 199 45 618 A1. In so-called "overrun mode" of the particular internal combustion engine, a single injector is activated and the activation duration is gradually increased until, in the event of a minimum activation duration, a change of a quantity replacement signal results, for example, a torque increase measurable on the internal combustion engine, on the basis of which it is recognizable that an injection has now occurred. The activation duration then provided corresponds to an operating state, in the case of which the injection just begins for the affected internal combustion engine, i.e., the cylinder of the internal combustion engine. This procedure is carried out accordingly with respect to all injectors or cylinders of the internal combustion engine. The nominal activation duration, i.e., the activation duration which would result without application of the function, is subtracted from the activation duration values thus obtained and the difference is stored in a nonvolatile way. During a subsequent activation of the injectors in the fired mode, the stored differences are added as activation duration correction values to the value which would result without use of the present function.

Furthermore, a method and a device for calibrating a fuel metering system of an internal combustion engine are known from published German patent application document DE 10 2008 002 482 A1, in which at least one injector is activated using a first test injection having a first test activation duration and a resulting first quantity signal is detected. The at least one injector is then activated using at least one second test injection having a second activation duration, which deviates from the first activation duration, and at least one second quantity signal thus resulting is detected. On the basis of the first minimum activation duration and the at least one second minimum activation duration and the first quantity signal and the at least one second quantity signal, a regression calculation is then carried out. The learning method during the zero-fuel quantity calibration may then be improved with the aid of the method provided therein, in that the time required for the learning of a calibration value is decreased.

In addition, a method and a device for calibrating the injection quantity of a partial injection in an injection system of an internal combustion engine are described in published German patent application document DE 10 2008 043 165 A1, in which a correction value for a partial injection in an individual cylinder of the internal combustion engine is ascertained by stimulating an injection pattern and by changing a speed variation of the internal combustion engine caused by the injection pattern. For this purpose, a quantity redistribution is carried out by changing over the injection pattern at a preferably stationary load point, typically in the idle state. For this purpose, the rail pressure is intentionally preset to particular calibration pressures. The calibration of the individual injectors at the individual rail pressure stages is carried out sequentially.

The calibration methods described in the first two publications may only be carried out in the above-mentioned overrun mode of the internal combustion engine. Such an operating state is not available in the case of some internal combustion engine types, for example, hybrid engines.

The method disclosed in the last-mentioned publication may also be carried out without overrun mode, for example, in driving mode of an internal combustion engine of the motor vehicle. However, the adjustment of the rail pressure, in particular the changeover of the injection pattern, is acoustically perceptible and is therefore not acceptable in the field of passenger automobiles as a result of the reduced driving comfort.

BRIEF SUMMARY OF THE INVENTION

One object of the present invention is therefore to provide a method and a device for calibrating a fuel metering system of an internal combustion engine, in particular of a motor vehicle, which have no influence on the driving comfort as a result of noise development and which are additionally also suitable for hybrid systems.

According to the method according to the present invention, for calibration of a fuel metering system affected here, it is provided that an injector to be calibrated has at least two test injections applied to it, which occur chronologically prior to the at least one first pilot injection, the first of the at least two test injections being carried out using a first activation duration, in the case of which the injector does not yet open. The activation duration of at least one further test injection, which is carried out in a subsequent injection cycle, is gradually increased until a change of an operating variable of the fuel metering system or the internal combustion engine results. A minimum activation duration of the injector is derived from the activation duration provided in the event of this change of the operating variable.

According to one variant of the method according to the present invention, the calibration is carried out in combination with a routine zero-fuel quantity calibration, at least one further test injection, which is carried out chronologically prior to a test injection of the zero-quantity calibration, being applied to an injector to be calibrated, and a resulting change of a quantity signal of the fuel metering system or the internal combustion engine being ascertained.

The activation duration of the chronologically applied second test injection is selected in such a way that in the event of the ascertainment of the quantity signal with the aid of zero-fuel quantity calibration (ZFC), a stable signal level significantly above the noise is achieved. The activation duration of the first test injection is gradually increased in each case proceeding from a level at which the injector reliably does not yet open, and this is carried out until a change of an operating variable of the fuel metering system results, in particular of the quantity replacement signal or the internal combustion engine.

Furthermore, the present invention relates to a device for calibrating a corresponding fuel metering system, which has control means for activating an injector to be calibrated using at least two test injections, which are carried out chronologically prior to a first pilot injection. The control means also allow the activation of the first test injection using an activation duration, in the case of which the injector does not yet open, and the gradual increase of the activation duration. The device also includes sensor means for detecting a change of an operating variable of the fuel metering system or the internal combustion engine and computing means for ascertaining a quantity replacement signal of the injector from the activation duration present in the event of the change of the operating variable.

The calibration method according to the present invention may be carried out in the fired mode of an internal combustion engine and is therefore also suitable for hybrid systems. In addition, the provided method does not generate any noticeable noises during the combustion and accordingly has no negative effects on the acoustic driving comfort.

The provided method and the device may be used in particular in a common-rail diesel injection system.

Further advantages and embodiments of the present invention result from the description and the appended drawings.

It is understood that the above-mentioned features and the features to be explained hereafter are usable not only in the particular specified combination, but rather also in other combinations or alone, without departing from the scope of the present invention.

DETAILED DESCRIPTION OF THE INVENTION

Figure 1A:
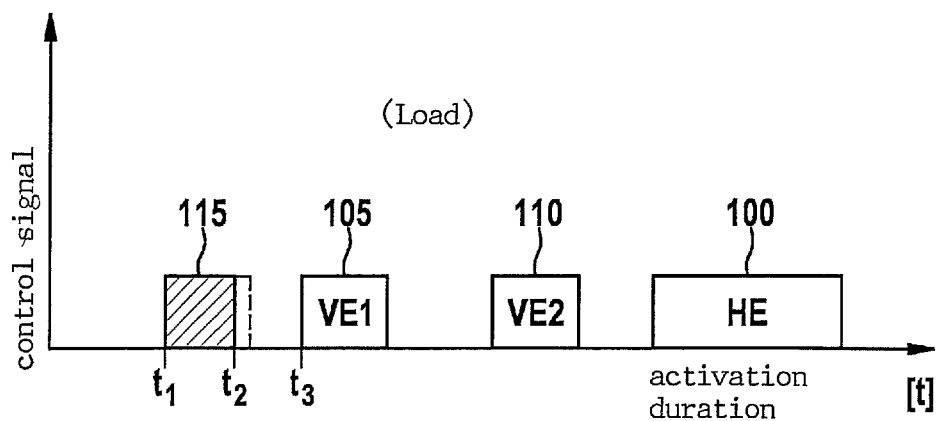
FIGS. 1a through 1c show three time diagrams to illustrate the test injections according to the present invention.

FIG. 1a shows the injection pattern of a first exemplary embodiment of test injections according to the present invention, which are carried out in load mode (also called "fired mode") of an assumed internal combustion engine. The control signal of an affected injector is plotted over the time (activation duration) in the diagram.

The injection pattern shown includes two pilot injections 105, 110 applied chronologically prior to a main injection 100. An additional test injection 115 according to the present invention is applied chronologically prior to pilot injections 105, 110. The present diagram only shows one such test injection having a first activation duration t2−t1, the respective at least one second test injection being activated accordingly using an increased activation duration (not shown here) at a subsequent point in time.

Time interval t3−t1 between test injection 115 and VE1 105 and activation duration t2−t1 of test injection 115 are preferably selected in such a way that a fuel pressure wave caused in the fuel metering system by test injection 115 amplifies the effect of the change of the operating variable with the aid of wave superposition. By way of the additional test injections, which are carried out chronologically beforehand, a fuel pressure wave is optionally triggered, which in turn influences the quantities of the normal injections (main injections and pilot injections). As long as the injector does not yet open because of an excessively short activation duration of test injection 115, no pressure wave is triggered. However, as soon as the activation duration is reached, at which the injector opens, a pressure wave begins to form.

The characteristic of the pressure wave, as a function of the time interval between the particular injections, is known per se. Therefore, the time interval between the test injections and the normal injections may be selected in such a way that the underlying measuring effect during the calibration is amplified. This amplification effect is shown in FIG. 1c, where a measured ZFC signal in the range of relatively short time intervals (in the present case in the range of 100 µs) of a test injection according to the present invention is significantly increased. The wave-shaped reduction is an indication of the underlying superposition affect (wave interference).

Figure 1B:
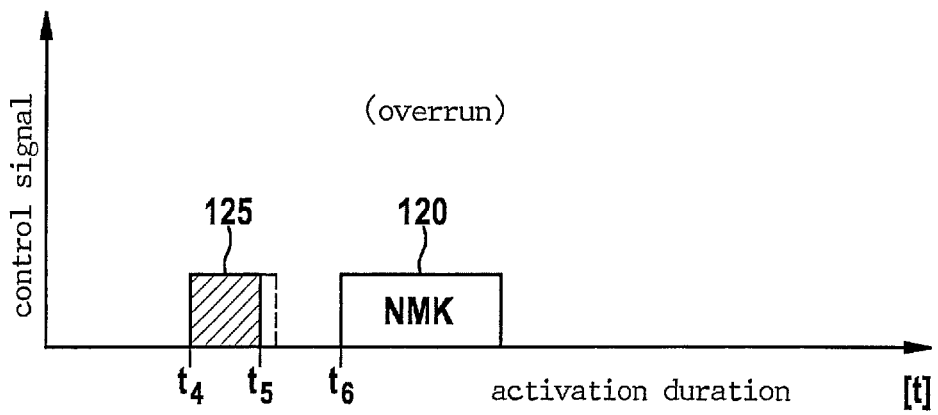
Figure 1C:
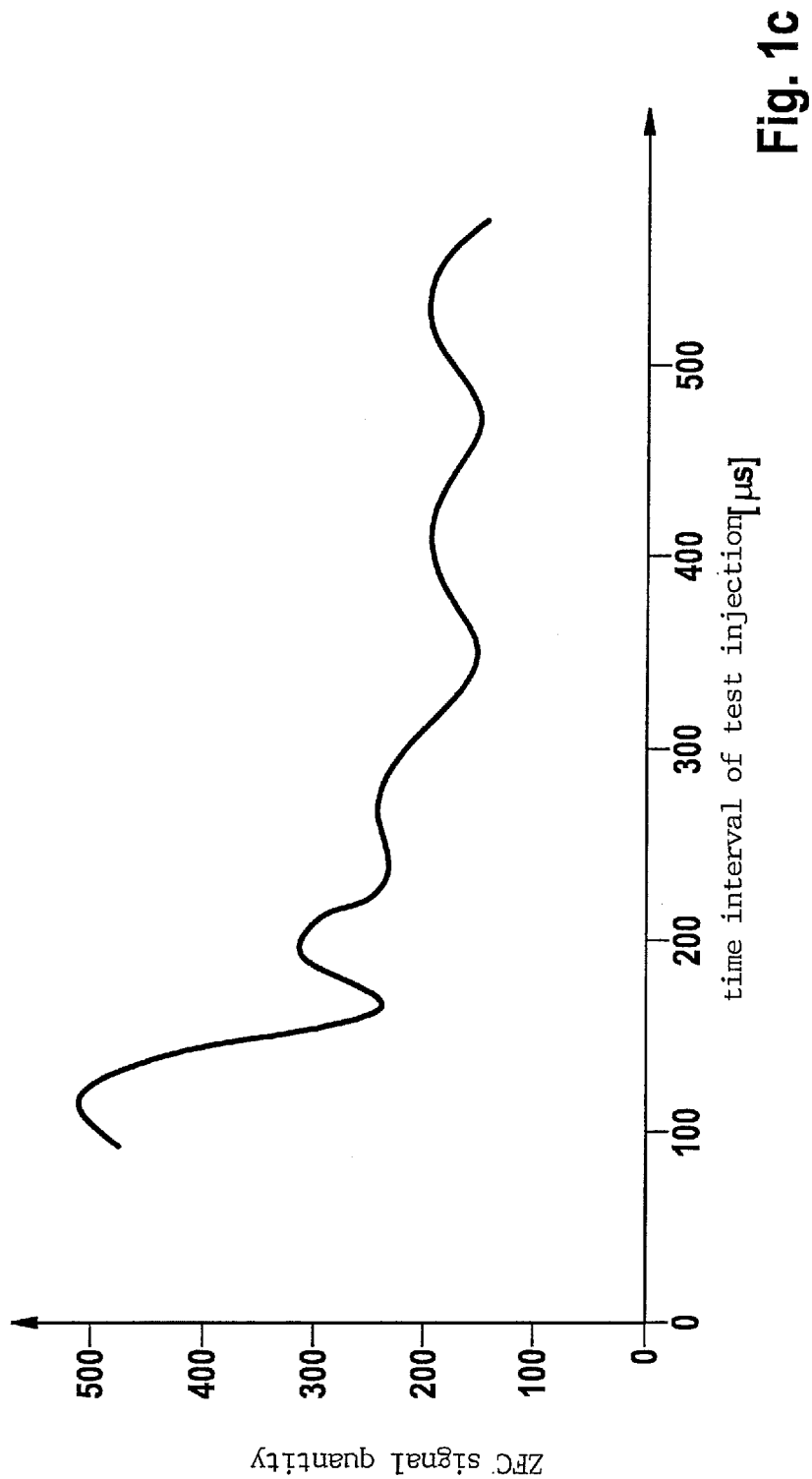

In the case of the injection pattern shown in FIG. 1b, a zero-fuel quantity calibration (ZFC) known in the related art is carried out in overrun mode. According to the present invention, at least two test injections 125 according to the present invention are carried out chronologically prior to ZFC injector activation 120.

As long as the activation duration of test injection 125 is still sufficiently short that the injector does not yet open, test injection 120 of the ZFC is not influenced. As soon as the activation duration of injection 125 exceeds the minimum activation duration and the injector thus opens, a pressure wave is triggered in the fuel system, which changes the quantity measured with the aid of the ZFC quantity replacement signal. By skilled selection of interval t6–t4, an amplification of the measuring effect as a result of the triggered pressure wave may also be used here.

Figure 2:
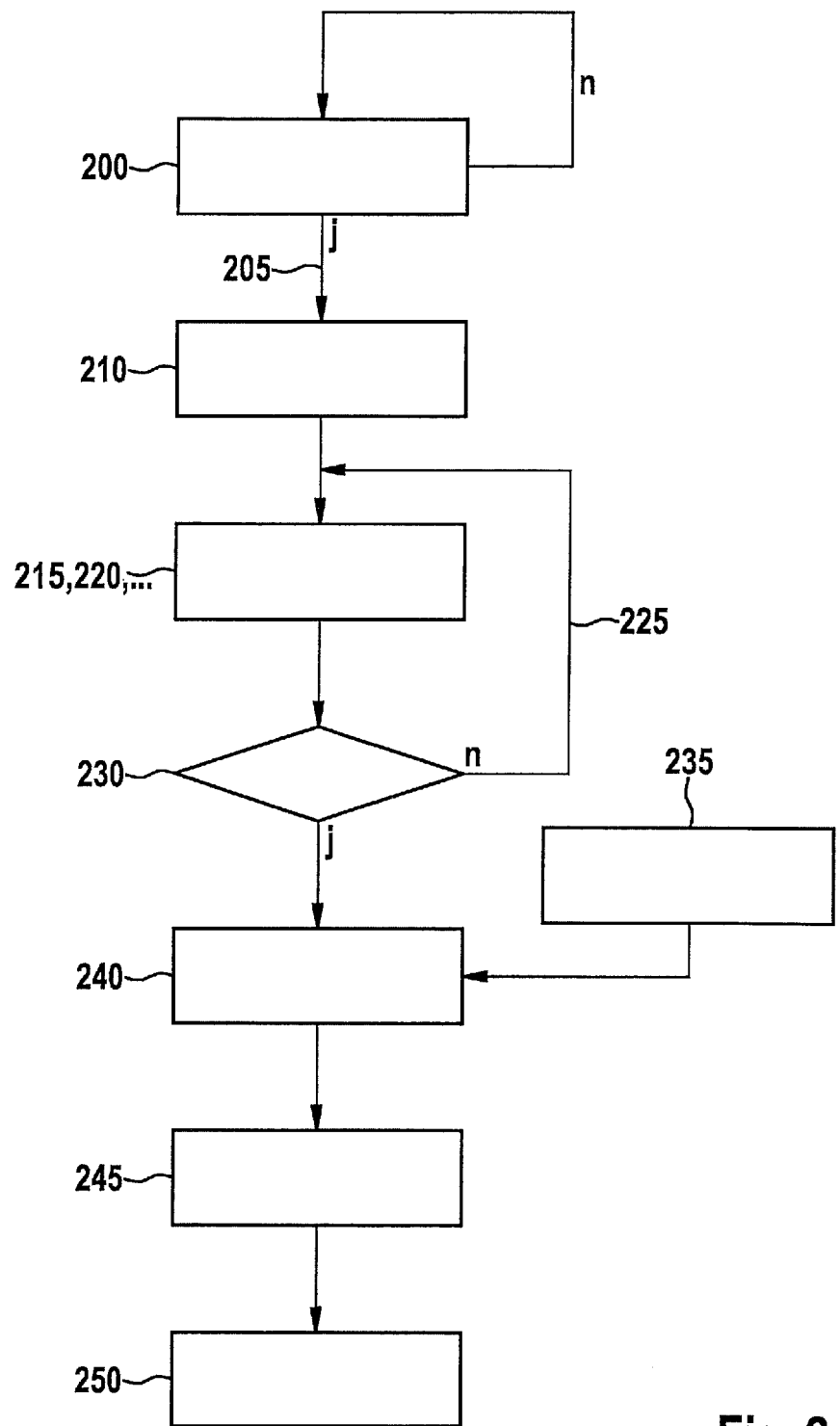
FIG. 2 shows an exemplary embodiment of the method according to the present invention on the basis of a flow chart.

FIG. 2 shows a flow chart of an exemplary embodiment of the calibration method according to the present invention. The calibration of small quantities of fuel is carried out in the example on the basis of an adaptive method. It is understood that the method may also be implemented as a non-adaptive system.

To allow precise calibration, it is advantageous to define stationary operating conditions of the internal combustion engine beforehand, which are used as a release condition for the described learning method. For example, stationary points of an emission test may be used. Therefore, a release test 200 is initially carried out according to the present invention.

Upon completed release 205, the calibration method according to the present invention is started 210 in the present case in load mode of the internal combustion engine. An injector to be calibrated has at least two test injections 215, 220 applied to it, which occur in addition to and chronologically prior to a first pilot injection. This may only be one single pilot injection or two or more, as in the example shown in FIG. 1a.

Proceeding from a first test injection 215 having a relatively short activation duration, in the case of which the injector reliably does not yet open, the activation duration is gradually increased 225 in the case of further test injections 220, which are carried out in particular subsequent injection cycles, until an amplitude and/or phase change of an operating variable of the fuel metering system or the internal combustion engine, for example, a change of a speed signal, results 230. Accordingly, the activation duration is ascertained at which the injector just begins to open, i.e., the minimum activation duration or activation duration for the so-called "zero-fuel quantity."

The injection timing (for example, point in time "t3" in FIG. 1a) and the activation durations of the normal injections (reference numerals 100, 105, and 110 in FIG. 1a) remain unchanged. Only the activation durations (t2–t1) of the successive test injections are varied, but not the starts of activation (t1) of the individual test injections.

A variable which characterizes the rotational uniformity of the internal combustion engine, for example, a speed signal delivered by an engine control unit, the output signal of a lambda sensor of an exhaust regulation, or the output signal of an ion current sensor provided in the exhaust regulation is preferably used as an operating variable. The change of the operating variable, for example, the speed signal of the internal combustion engine, is analyzed with respect to amplitude and/or phase. The change of the operating variable may be analyzed with the aid of linear regression and determination of an inflection point, or with the aid of routine curve discussion (determination MIN/MAX or turning point). This inflection point is considered to define the injector behavior.

A value of a nominal minimum activation duration, which is ascertained 235 beforehand on a reference injector, is subtracted 240 from the ascertained minimum activation duration and the resulting difference value is used 245 as a correction value for the fuel metering system and/or the internal combustion engine. The ascertained difference value may be stored 250 as a learned correction value in an adaptive calibration system.

In the case of the application of the calibration method according to the present invention in a fuel metering system, which has a common-rail system, of a compression-ignition internal combustion engine, the correction value may be ascertained in the case of at least two different rail pressures and the resulting learned values may be stored as a rail-pressure-dependent characteristic curve.

The underlying rail pressure may advantageously be selected in accordance with the rail pressure resulting in normal driving mode and must if need be only be "frozen" for short calibration sequences of a few camshaft revolutions. The learned values are ascertained in this case not only for each injector at fixedly predefined pressure stages, as is the case in the related art (for example, zero-fuel quantity calibration), but rather are stored as a rail-pressure-dependent characteristic curve. The necessity is thus dispensed with of an interpolation/extrapolation of learned values via various values of the rail pressure.

In the variant shown in FIG. 1b, the classic overrun mode is used as a stationary point (see above-described release condition). This allows a combination of the present method with the method known per se of zero-fuel quantity calibration (ZFC). In addition to a normal ZFC test injection having an activation duration which corresponds to a typical pilot injection quantity (for example, 1-2 $mm^3/H$), according to the present invention, successive further test injections are applied and the particular activation duration thereof is varied, as described hereafter. As long as the injector activation which is chronologically beforehand does not yet result in opening of the injector, a relatively constant quantity replacement signal, which is measurable significantly above the noise level, is generated. As soon as the additional activation of the test injections according to the present invention result in opening of the injector, a sharp inflection in the quantity replacement signal may be detected. The above-described pressure wave effect may also be used here to amplify the measuring signal.

The advantage over the ZFC method known in the related art is that in the case of the ZFC, the transmission behavior of the drive train must be measured in detail for every variant, to be able to establish the quantitative relationship between the measured quantity replacement signal and the actual injected quantity, whereas in the present method, a simple inflection recognition is sufficient. In the case of the inflection recognition, it is not necessary to know the mentioned quantitative relationship, but rather only to know the underlying proportionality (since it is a simple detection of the transition "injector does not open" to "injector opens").

Alternatively to the excitation at camshaft frequency, the injector or cylinder to be calibrated experiencing an additional test injection during every work cycle, the additional test injection may also be carried out at one-half, one-third, etc., of the camshaft frequency. The advantage of this alternative is that a so-called smooth running control or "fuel balance control" (FBC) does not have to be turned off for this purpose, since it is "blind" for half of the camshaft frequency and the harmonics thereof as a result of its speed analysis method. A corresponding FBC/MAR frequency analysis is described, for example, in the prior-published application DE 195 27 218 A1, in particular FIG. 2 therein.

Furthermore, it is to be noted that the described method may also be carried out simultaneously on two cylinders of an internal combustion engine. In this case, the measuring signal is analyzed both according to absolute value and also according to phase. The excitation is thus introduced through each of the two cylinders onto the drive train and adds up according to the absolute value and the phase to form a total vibration.

Since the angle between the two cylinders is known, the absolute value of the two individual vibrations may be ascertained by measuring the absolute value and the phase of the total vibration.

The method may additionally be combined with a regression algorithm described in published German patent application document DE 10 2008 002 482 A1. For this purpose, the quantity signals are stored as a function of the activation duration and the rail pressure and a characteristic map smoothing described therein is carried out.

Figure 3:
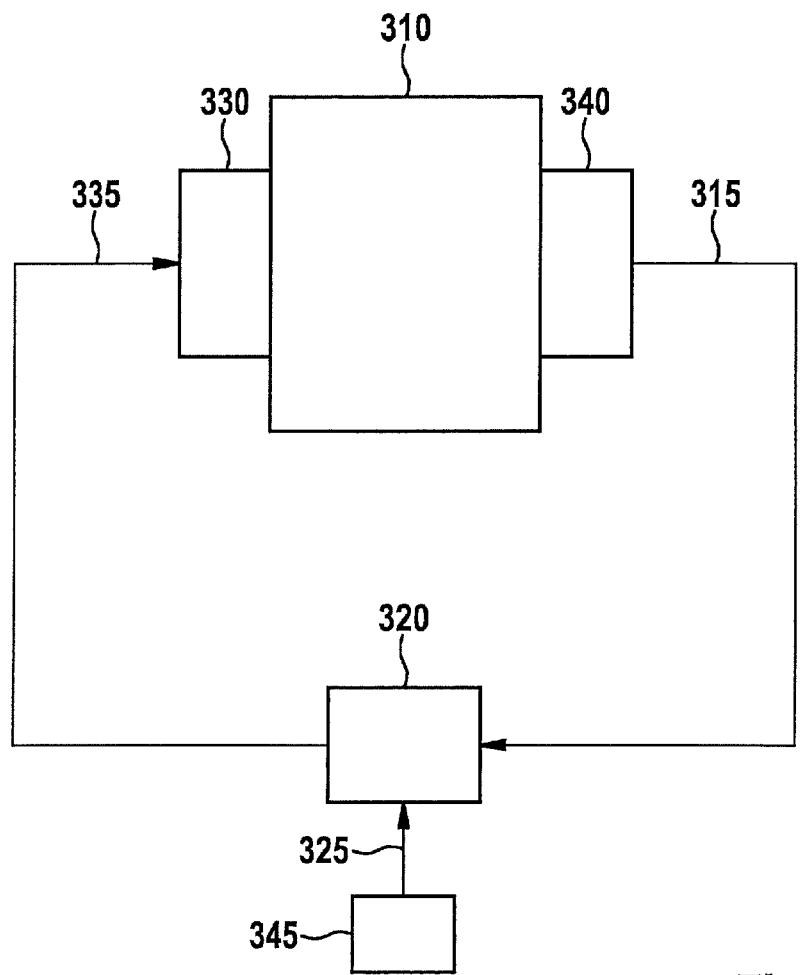
FIG. 3 shows an exemplary embodiment of the device according to the present invention on the basis of a block diagram.

FIG. 3 shows, in the form of a block diagram, essential functional elements of a fuel metering system of an internal combustion engine known from prior-published application DE 10 2008 002 482 A1, in which the present invention is usable having the mentioned advantages. The fuel metering system shown is preferably situated in a compression-ignition or direct-injection motor vehicle engine.

An internal combustion engine 310, which is only schematically indicated, receives a specific fuel quantity at a specific point in time metered from a fuel metering unit 330. Various sensors 340 detect measured values 315, which characterize the operating state of the internal combustion engine, and conduct them to a control unit 320. Furthermore, various output signals 325 of further sensors 345 are fed to control unit 320. These sensors detect operating variables which characterize the state of the fuel metering unit and/or surroundings conditions. One such variable is, for example, the driver intention. Control unit 320 calculates—proceeding from measured values 315 and further variables 325—activation pulses 335, which are applied to fuel metering system 330.

Fuel metering system 330 may be designed in various ways. Thus, a distributor pump may be used as a fuel metering system, in which a solenoid valve determines the point in time and/or the duration of the fuel injection. Furthermore, the fuel metering unit may be designed as a common-rail system. A high-pressure pump compresses fuel in an accumulator therein. The fuel then reaches the combustion chambers of the internal combustion engine from this accumulator via injectors. The duration and/or the beginning of the fuel injection is/are controlled with the aid of the injectors. The injectors preferably contain a solenoid valve or a piezoelectric actuator.

Control unit 320 calculates the fuel quantity to be injected into the internal combustion engine in a known way. This calculation is carried out as a function of various measured values 315, for example, speed n or operating temperature of internal combustion engine 310, the actual start of injection and optionally still further variables 325, which characterize the operating state of the vehicle. These further variables are, for example, the position of the accelerator pedal or the pressure and the temperature of the ambient air. Furthermore, it may be provided that a torque request is predefined by other control units, for example, the transmission controller.

Control unit 320 then converts the desired fuel quantity into activation pulses. These activation pulses are then applied to the quantity-determining element of the fuel metering unit. The mentioned electrically operated valve is used as the quantity-determining element. This electrically operated valve is situated in such a way that the fuel quantity to be injected is established by the opening duration or by the closing duration of the valve. It is understood that the injector described herein may also include other fuel metering devices, for example, conventional injectors or piezo-controlled injectors, since the application of the present invention is not dependent on technical features of these devices.

What is claimed is:

1. A method for calibrating a fuel metering system including an injector of an internal combustion engine, the fuel metering system providing at least one pilot injection chronologically prior to a main injection, the method comprising:
    applying, using the injector, at least two test injections which occur chronologically prior to the at least one pilot injection, wherein:
        a first test injection is carried out using a first activation duration in which the injector does not yet open, and
        at least one second test injection is carried out in at least one subsequent injection cycle each having a progressively increasing activation duration relative to the first test injection until a change of an operating variable of one of the fuel metering system or the internal combustion engine results; and
    ascertaining a minimum activation duration of the injector based on the activation duration during which the change of the operating variable of one of the fuel metering system or the internal combustion engine results.

2. The method as recited in claim 1, comprising:
    performing a zero-fuel quantity calibration;
    applying at least one further test injection, which occurs chronologically prior to a test injection of the zero-fuel quantity calibration, to the injector; and
    ascertaining a resulting change of one of a quantity signal of the fuel metering system or the internal combustion engine.

3. The method as recited in claim 1, wherein the operating variable of one of the fuel metering system or the internal combustion engine is a variable which characterizes one of a rotational uniformity of the internal combustion engine, an output signal of a lambda sensor, or an output signal of an ion current sensor.

4. The method as recited in claim 3, wherein a change of a speed signal of the internal combustion engine is analyzed with respect to at least one of amplitude and phase.

5. The method as recited in claim 3, wherein the change of the operating variable is analyzed with the aid of linear regression and determination of an inflection point.

6. The method as recited in claim 3, wherein:
    a reference minimum activation duration, which is ascertained on a reference injector, is subtracted from the ascertained minimum activation duration; and
    the resulting difference value is used as a correction value for at least one of the fuel metering system and the internal combustion engine.

7. The method as recited in claim 6, wherein the difference value is stored as a learned correction value in an adaptive calibration system.

8. The method as recited in claim 7, wherein:
    the fuel metering system has a common rail system;
    the correction value is ascertained for each of at least two different rail pressures; and
    the resulting difference values are stored as learned correction values in the form of a rail-pressure-dependent characteristic curve.

9. The method as recited in claim 3, wherein the time interval between the at least one pilot injection and the at least two test injections is set in such a way that a fuel pressure wave, which is caused in the fuel metering system by the at least two test injections, amplifies the effect of the change of the operating variable with the aid of wave superposition.

10. The method as recited in claim 9, wherein the at least two test injections are carried out in a fired mode of the internal combustion engine.

11. A device for calibrating a fuel metering system including an injector of an internal combustion engine, the fuel metering system providing at least one pilot injection chronologically prior to a main injection, the device comprising:
- a control unit configured to activate the injector to apply at least two test injections which occur chronologically prior to the at least one pilot injection, wherein:
  - a first test injection is carried out using a first activation duration in which the injector does not yet open, and
  - at least one second test injection is carried out in at least one subsequent injection cycle each having a progressively increasing activation duration relative to the first test injection until a change of an operating variable of one of the fuel metering system or the internal combustion engine results; and
- a sensor system for detecting the change of the operating variable of one of the fuel metering system or the internal combustion engine;
- wherein the control unit ascertains a minimum activation duration of the injector based on the activation duration during which the change of the operating variable of one of the fuel metering system or the internal combustion engine results.

\* \* \* \* \*